United States Patent Office 3,597,426
Patented Aug. 3, 1971

3,597,426
UNSYMMETRICAL DISUBSTITUTED PERTHIOCYANATES
Raymond Seltzer, New York, N.Y., assignor to
M & T Chemicals Inc., New York, N.Y.
No Drawing. Filed Oct. 2, 1968, Ser. No. 764,626
Int. Cl. C07d 55/50, 91/60
U.S. Cl. 260—248CS    3 Claims

ABSTRACT OF THE DISCLOSURE

This invention relates to novel compositions and to a process for preparing a compound comprising recurring units of the formula

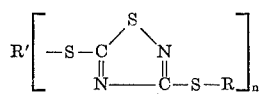

in which R is different from R' and each is selected from the group consisting of alkyl, activated aryl, aralkyl, activated alkaryl, alkenyl in which the double bond is not attached on the alpha carbon atoms, and heterocyclic groups, and $n$ is an integer 1–3.

---

This invention relates to thiadiazoles and more particularly, to unsymmetrical disubstituted 3,5-dimercapto-1,2,4-thiadiazoles and their preparation.

Symmetrical dialkyl and diaralkyl 3,5-dimercapto-1,2,4-thiadiazoles have been reported in the literature. Because of the difference between the sulfur atoms attached to the 3 and 5 carbon atoms of the 1,2,4-thiadiazole ring

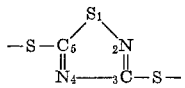

the conventional synthesis routes have not been satisfactory for the preparation of unsymmetrical disubstituted perthiocyanates and these compounds have thus heretofore been unknown.

It is an object of this invention to provide a new class of unsymmetrical derivatives of 3,5-dimercapto-1,2,4-thiadiazole. It is a further object to provide a novel synthesis technique for the preparation of these new compounds. Other objects of this invention will be obvious to those skilled in the art on inspection of the following description.

This invention relates to novel compositions and to a process for preparing a compound comprising recurring units of the formula

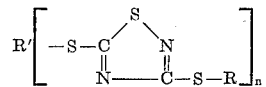

in which R is different from R' and each is selected from the group consisting of alkyl, activated aryl, aralkyl, activated alkaryl, alkenyl in which the double bond is not attached on the alpha carbon atoms, and heterocyclic groups, and $n$ is an integer 1–3.

The novel process of this invention comprises reacting a compound of the formula:

$$R'-X$$

in which X is a halogen, or an ester of sulfonic or sulfuric acid and R' and $n$ have the same meanings as stated above with a heterocyclic part of the formula:

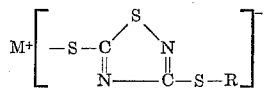

in which M is a metal ion. The product is then recovered from the reaction medium.

The process of this invention just described may be represented by the partial equations:

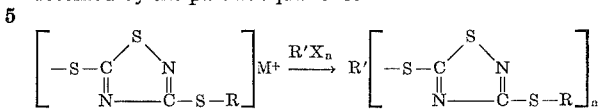

The suitable compound $R'X_n$ for the reaction may be selected from a wide range of chemicals containing the replaceable group X. In this compound, X may be selected from the group consisting of halogens, sulfate esters and sulfonate esters, and R may be a hydrocarbon radical preferably selected from the group consisting of alkyl, cycloalkyl, aralkyl, alkenyl in which the double bond is not attached to the alpha carbon atom, and including such radicals when inertly substituted. When R is alkyl, it may typically be straight chain alkyl or branched alkyl, including methyl, ethyl n-propyl, isopropyl, n-butyl, isobutyl, sec-butyl, tert-butyl, n-amyl, neopentyl, isoamyl, n-hexyl, isohexyl, heptyls, octyls, decyls, dodecyls, tetradecyl, octadecyl, etc. Preferred alkyl includes lower alkyl, i.e. having less than about 8 carbon atoms, e.g. octyls and lower. When R is alkenyl, it may typically be allyl, 1-propenyl, methallyl, buten-1-yl, buten-2-yl, buten-3-yl, penten-1-yl, hexenyl, heptenyl, octenyl, decenyl, dodecenyl, tetradecenyl, octadecenyl, etc. When R is cycloalkyl, it may typically be cyclopentyl, cyclohexyl, cycloheptyl, cyclooctyl, etc. When R is aralkyl, it may typically be benzyl, β-phenylethyl, γ-phenylpropyl, β-phenylpropyl, etc. R may be inertly substituted, i.e. R may bear a non-reactive substituent such as alkyl, aryl, cycloalkyl, aralkyl, alkaryl, alkenyl, ether, nitro, etc. Typical substituted alkyls, cycloalkyls, and aralkyls include 2-ethoxyethyl, carboethoxymethyl, p-phenylbenzyl, p-methylbenzyl, etc.

R' may also be an activated aryl or alkaryl which contain substituents in the aromatic ring which facilitate the cleavage of the replaceable group X in the reaction with the thiadiazole. Typical activated aryl or alkaryl radicals may contain one or more substituents such as $-NO_2$, $-CN$, $-CF_3$, and $SO_2R''$ in the aromatic ring wherein R'' is an alkyl radical. Particularly effective aryl or alkaryl radicals for the reaction with thiadiazoles are those containing the substituents in the ortho or para positions with respect to the replaceable group X. This type of activated aromatic compound may be represented by the formula:

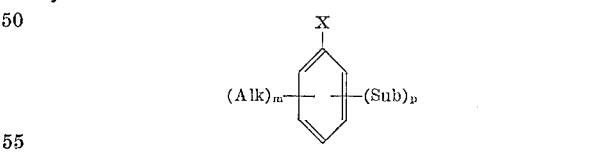

where (Sub) represents substituents occupying at least the ortho or para position, $p$ is an integer 1–5, (Alk) represents an alkyl radical, and $m$ is zero or an integer not greater than the available positions in the ring.

The heterocyclic compounds which may be used may have one to three replaceable groups attached on either the heterocyclic ring or the inert substituents of the heterocyclic compound. Typical example of compounds of this type is the triazine derivative containing one to three replaceable halogen groups.

The compound $RX_n$ preferably is an alkylating agent in which X is a chlorine, bromine or iodine attached on the alkyl portion of the compound and $n$ in this type of compound is one.

The heterocyclic salt suitable for the reaction may be prepared by any known method. Advantageously it may be prepared by reacting an alkali metal salt of perthiocyanic acid with a compound of the formula:

RX in which R has the same significance as the R' depicted hereinabove, X also has the same meaning as above stated. This process may be represented by the partial equations:

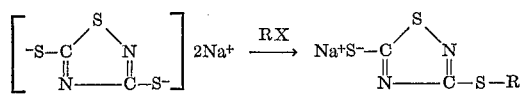

In place of alkali metal, copper, aluminum, iron or magnesium may be placed in the heterocyclic compounds and may be suitable for the process of this invention.

The process involving the reaction of the heterocyclic salt with the compound $RX_n$ is preferably conducted in an aqueous organic solvent capable of at least partially dissolving the reactants. The nature of the solvent is not critical, and thus any suitable inert organic solvent may also be used. Typical solvents that may be employed include alkanols such as methanol and ethanol; ketones such as acetone or methyl ethyl ketone; and ethers such as dioxane and tetrahydrofuran. The amount of reaction medium is immaterial as long as sufficient amount is used to maintain the reaction in a liquid medium.

Conveniently, the reaction may be carried out in the ambient temperature although the reaction may proceed within a wide temperature limit. Generally, there is no advantage to carrying out the reaction in a temperature much below 0° C. or exceeding 200° C. A suitable temperature range is 15°–50° C.

The relative proportions of the two reactants, the alkali metal salt of mono-substituted perthiocyanate and the compound $R'X_n$ are about the stoichiometric ratio, however, it does not appear to have any sharp critical limit.

Recovery of the composition from the reaction mixture is governed by the physical properties of the specific product and by the solvents used. The solvent selected is preferably one in which the product is soluble at elevated temperatures and insoluble at lower temperatures, thus facilitating recovery by filtration.

By the selection of proper compounds of the formula $R'X_n$ a new class of unsymmetrical disubstituted perthiocyanates is obtained. The disubstituted perthiocyanates with two dissimilar substituents are useful as agents for the control of pestiferous organisms, particularly bacteria, fungi, and marine organisms.

Further to illustrate this invention specific examples are described hereinbelow:

EXAMPLE 1

3-methylmercapto-5(2',4'-dinitrophenyl-1')-mercapto-1,2,4-thiadiazole

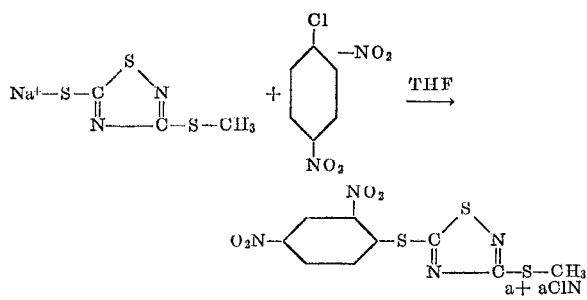

To a stirred solution of 0.13 mole of the sodium salt of 3-methylmercapto-5-mercapto-1,2,4-thiadiazole in 100 milliliters of tetrahydrofuran was added dropwise 0.1 mole of 1-chloro-2,4-dinitrobenzene dissolved in 100 milliliters of tetrahydrofuran, while keeping the temperature between 15°–20° C. After completing the addition, the reaction mixture was stirred overnight at room temperature, and then filtered. The filtrate was poured onto ice; the resulting yellow solid was filtered, washed free of chloride ion and dried in the vacuum oven at 80° C. to give 31.0 grams (94%) of product, melting point 100°–115° C. Recrystallization from carbon tetrachloride gave 19.0 grams of analytically pure 3-methylmercapto-5-(2'-4'-dinitrophenyl-1')-mercapto - 1,2,4 - thiadiazole, melting point 117°–118° C.

*Elemental analysis.*—Calculated for $C_9H_6N_4O_4S_3$ (percent): C, 32.8; H, 1.8; N, 16.9; S, 29.1. Found (percent): C, 32.7; H, 1.8; N, 17.0; S, 28.9.

EXAMPLE 2

3-methylmercapto-5-benzylmercapto-1,2,4-thiadiazole

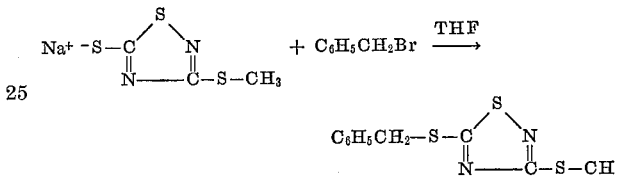

To 0.031 mole of the sodium salt of 3-methylmercapto-5-mercapto-1,2,4-thiadiazole dissolved in 25 milliliters of tetrahydrofuran was added 0.03 mole of benzyl bromide dissolved in 25 milliliters of tetrahydrofuran. The reaction mixture was stirred overnight at room temperature and then filtered. The solvent was stripped from the filtrate leaving 7.3 grams of a red liquid (orange solid present) which was filtered giving 6.8 grams of liquid. Distillation gave 5.4 grams (70%) of 3-methylmercapto-5-benzylmercapto-1,2,4-thiadiazole as a light yellow liquid; boiling point 195°–197°/2 millimeters, $n_D^{25}$ 1.6585.

*Elemental analysis.*—Calculated for $C_{10}H_{10}N_2S_3$ (percent): N, 11.0; S, 37.8. Found (percent): N, 11.0; S, 37.4.

EXAMPLE 3

3-methylmercapto-5-decylmercapto-1,2,4-thiadiazole

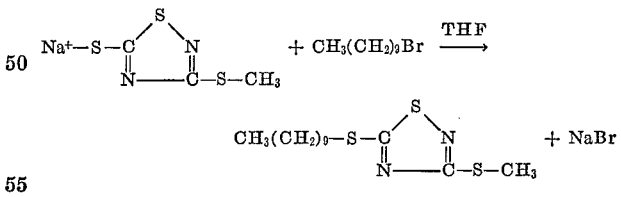

To a solution of 0.07 mole of sodium hydroxide in 15 milliliters of water and 50 milliliters of methanol was added 0.07 mole of 3-methylmercapto-5-mercapto-1,2,4-thiadiazole. The mixture was stirred until solution resulted and then was filtered. The filtrate was stripped to dryness, the residue was dissolved in 125 milliliters of tetrahydrofuran. While stirring the tetrahydrofuran solution at room temperature, 0.07 mole of 1-bromodecane was added, and the reaction stirred at room temperature overnight (19 hours). Precipitation occurred as the reaction proceeded. The filtrate was stripped to dryness leaving a semisolid. Trituration with hexane gave an additional 1.8 grams of solid which was filtered. The hexane was stripped from the filtrate leaving 20.0 grams (90%) of an orange oil. Vacuum distillation at 1 millimeter gave 10.0 grams of pure 3-methylmercapto - 5 - decylmercapto - 1,2,4 - thiadiazole, boiling point 202°–205° C., $n_D^{27}$ 1.5460.

*Elemental analysis.*—Calculated for $C_{13}H_{24}N_2S_3$ (percent): N, 9.2; S, 31.5. Found (percent): N, 9.0; S, 31.2.

EXAMPLE 4

Tris(3-methylmercapto-1,2,4-thiadiazole-5)-trithiocyanurate

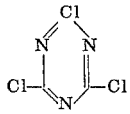

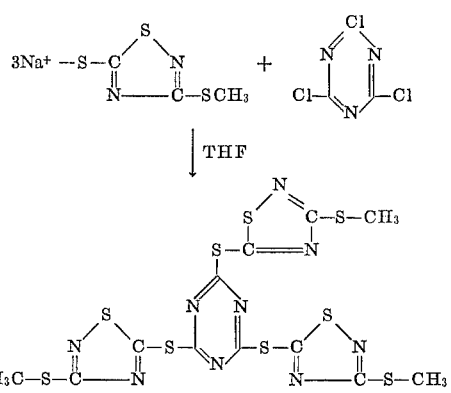

To 0.12 mole of the sodium salt of 3-methylmercapto-5-mercapto-1,2,4-thiadiazole dissolved in 100 milliliters of dry tetrahydrofuran (distilled from sodium hydride) was added 7.26 grams (0.04 mole) of cyanuric chloride dissolved in 50 milliliters of tetrahydrofuran. Immediate precipitation occurred, and the temperature rose to 45° C. The reaction mixture was then refluxed for 1 hour, and allowed to stand at room temperature overnight. The reaction mixture was filtered, the residue was washed with tetrahydrofuran and dried to give 20.5 grams. Washing the product free of chloride with water gave 16.5 grams (73%) of a buff colored product. The crude was washed with boiling dioxane and boiling acetonitrile to give 12.0 grams (53%) of tris-(3-methylmercapto-1,2,4-thiadiazole-5)-trithiocyanurate, melting point 252°–254° C. (shrinks at 235° C.).

*Elemental analysis.*—Calculated for $C_{12}H_9N_9S_9$ (percent): C, 25.4; H, 1.6; N, 22.2; S, 50.7; Cl, 0.0. Found (percent): C, 25.5; H, 1.6; N, 21.9; S, 50.1; Cl, 0.1.

Although this invention has been illustrated by reference to specific embodiments, modifications thereof which are clearly within the scope of the invention will be apparent to those skilled in the art.

I claim:

1. An unsymmetrical heterocyclic compound wherein it has the formula:

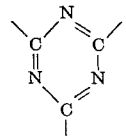

2. An unsymmetrical heterocyclic compound wherein it has the formula:

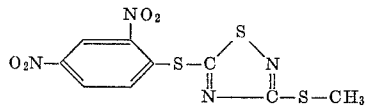

3. An unsymmetrical heterocyclic compound which has the formula:

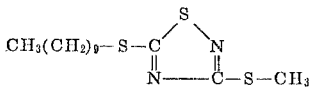

References Cited

UNITED STATES PATENTS

| | | | |
|---|---|---|---|
| 2,756,238 | 7/1956 | D'Amico | 260—248X |
| 3,138,607 | 6/1964 | Brown | 260—302 |
| 3,478,045 | 11/1969 | Hahn et al. | 260—302 |

JOHN M. FORD, Primary Examiner

U.S. Cl. X.R.

260—302SD, 302H, 999

UNITED STATES PATENT OFFICE
CERTIFICATE OF CORRECTION

Patent No. 3,597,426      Dated August 3, 1971

Inventor(s) Raymond Seltzer

It is certified that error appears in the above-identified patent and that said Letters Patent are hereby corrected as shown below:

Column 5, lines 5 to 10, cancel the formula.

Column 6, claim 1, the formula should appear as shown below:

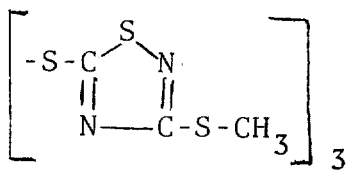      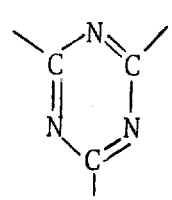

Signed and sealed this 25th day of April 1972.

(SEAL)
Attest:

EDWARD M. FLETCHER, JR.　　　　　　ROBERT GOTTSCHALK
Attesting Officer　　　　　　　　　　Commissioner of Patents